(12) United States Patent
Lee (10) Patent No.: US 10,396,406 B2
(45) Date of Patent: Aug. 27, 2019

(54) BATTERY MODULE

(71) Applicant: SAMSUNG SDI CO., LTD., Yongin-si, Gyeonggi-do (KR)

(72) Inventor: Dohyung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 531 days.

(21) Appl. No.: 15/094,627

(22) Filed: Apr. 8, 2016

(65) Prior Publication Data

US 2017/0054186 A1 Feb. 23, 2017

(30) Foreign Application Priority Data

Aug. 18, 2015 (KR) ........................ 10-2015-0115994

(51) Int. Cl.
| | |
|---|---|
| *H01M 10/48* | (2006.01) |
| *H01M 10/0525* | (2010.01) |
| *H01M 2/10* | (2006.01) |
| *H01M 10/613* | (2014.01) |
| *H01M 10/623* | (2014.01) |
| *H01M 10/625* | (2014.01) |
| *H01M 10/6566* | (2014.01) |
| *H01M 10/6557* | (2014.01) |

(52) U.S. Cl.
CPC ....... *H01M 10/486* (2013.01); *H01M 2/1022* (2013.01); *H01M 2/1072* (2013.01); *H01M 10/0525* (2013.01); *H01M 10/613* (2015.04); *H01M 10/623* (2015.04); *H01M 10/625* (2015.04); *H01M 10/6557* (2015.04); *H01M 10/6566* (2015.04); *H01M 2220/20* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 2003/0185278 | A1* | 10/2003 | Roepke | H01M 10/486 374/152 |
| 2006/0028183 | A1* | 2/2006 | Izawa | B60L 3/0046 320/150 |
| 2007/0264562 | A1* | 11/2007 | Kang | H01M 2/105 429/96 |
| 2008/0124627 | A1 | 5/2008 | Shimoyama | |
| 2012/0052359 | A1* | 3/2012 | Yoshitake | H01M 2/1077 429/120 |
| 2012/0315508 | A1* | 12/2012 | Kurita | H01M 2/1077 429/7 |

FOREIGN PATENT DOCUMENTS

KR   10-2008-0048633 A   6/2008

* cited by examiner

*Primary Examiner* — Eli S Mekhlin
(74) *Attorney, Agent, or Firm* — Lewis Roca Rothgerber Christie LLP (57) ABSTRACT

A battery module includes: a first battery cell; a second battery cell, each of the first and second battery cells having first sides and second sides, the first sides being larger than the second sides; a holder between the first battery cell and the second battery cell; and a temperature measuring unit coupled to the holder, the temperature measuring unit contacting one of the first sides of at least one of the first and second battery cells, and being configured to measure a temperature of the at least one of the first and second battery cells.

9 Claims, 6 Drawing Sheets

BATTERY MODULE

CROSS-REFERENCE TO RELATED APPLICATION

This application claims priority to and the benefit of Korean Patent Application No. 10-2015-0115994, filed on Aug. 18, 2015 in the Korean Intellectual Property Office, the contents of which are incorporated by reference herein in their entirety.

BACKGROUND

1. Field

Embodiments of the present invention relate to a battery module.

2. Description of the Related Art

Unlike primary batteries, which are not designed to be recharged, secondary batteries are designed to recharged. Secondary batteries are used in a wide range of applications, including high-end small electronic devices such as mobile phones, personal digital assistants (PDAs), and notebook computers, and energy storage systems.

Because secondary batteries are designed to be repeatedly charged and discharged for long-term use, useable periods (e.g., battery lifetime) and battery stability are important factors to be considered. Thus, the temperature of secondary batteries should be properly managed so that the secondary batteries do not excessively deteriorate and the lifetime thereof may not be excessively decreased. Accordingly, controlling the temperature of secondary batteries is an important consideration for secondary batteries.

SUMMARY

Embodiments of the present invention provide a battery module which can accurately measure the temperature of a battery cell.

The above and other aspects of embodiments of the present invention will be described in, or will be apparent from, the following description of exemplary embodiments.

According to an embodiment of the present invention, a battery module includes: a first battery cell; a second battery cell, each of the first and second battery cells having first sides and second sides, the first sides being larger than the second sides; a holder between the first battery cell and the second battery cell; and a temperature measuring unit coupled to the holder, the temperature measuring unit contacting one of the first sides of at least one of the first and second battery cells, and being configured to measure a temperature of the at least one of the first and second battery cells.

The temperature measuring unit may include: a temperature device configured to measure the temperature of the at least one of the first and second battery cells; and a connector configured to transmit data regarding the temperature measured by the temperature device.

The holder may have: a long side contacting the first sides of the first battery cell and the second battery cell; and a short side extending from a periphery of the long side toward the first battery cell and the second battery cell and contacting a second side of each of the first battery cell and the second battery cell.

The holder may have a receiving groove at the long side thereof accommodating the temperature device, and a protrusion at the long side thereof and around the receiving groove.

The protrusion may have an oval shape or a polygonal shape.

The protrusion may protrude from the long side of the holder toward the first battery cell and may contact the first battery cell.

The receiving groove may be at a portion of the long side of the holder which corresponds to a center of the first sides of the first battery cell and the second battery cell.

The long side of the holder may have a wire groove in which a wire electrically connecting the temperature device and the connector is arranged.

The short side of the holder may have a fixing groove, and the connector may be arranged in the fixing groove and exposed to outside of the holder.

The holder may further have a cooling opening at the short side thereof and configured to allow air to enter between the first battery cell and the long side of the holder to cool the first battery cell, and an exhaust opening at the short side thereof and configured to allow condensed water accumulated on the first battery cell to drain from the holder.

The holder may further have a coupling protrusion and a coupling groove in the short side thereof, the coupling protrusion and the coupling groove may be configured to be combined with the coupling groove and the coupling protrusion, respectively, of another holder.

The battery module according to embodiments of the present invention can accurately measure temperatures of the long sides of the battery cells by arranging a temperature measuring unit in a holder which is arranged between adjacent ones of the battery cells.

BRIEF DESCRIPTION OF THE DRAWINGS

The above and other aspects of the present invention will become more apparent by describing, in detail, exemplary embodiments thereof with reference to the attached drawings in which.

DETAILED DESCRIPTION

Hereinafter, example embodiments of the present invention will be described, in detail, with reference to the accompanying drawings such that they can easily be made and used by those skilled in the art.

The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will be defined by the appended claims and their equivalents.

In the drawings, the thickness of layers and regions are exaggerated for clarity. Like numbers refer to like elements throughout. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. In addition, it will be understood that when an element A is referred to as being "on," "connected to," or "coupled to" an element B, the element A can be directly on, connected to, or coupled to the element B or an intervening element C may be present between the elements A and B so that the element A can be indirectly on, connected to, or coupled to the element B. When the element A is referred to as being "directly on," "directly connected to," or "directly coupled to" the element B, there are no intervening elements or layers present.

In addition, the terminology used herein is for the purpose of describing particular embodiments and is not intended to be limiting thereof. As used herein, singular forms are intended to include plural forms as well, unless the context clearly indicates otherwise. It will be further understood that the terms "includes," "including," "comprise," and/or "comprising," when used in this specification, specify the presence of stated features, integers, steps, operations, elements, and/or components but do not preclude the presence or addition of one or more other features, integers, steps, operations, elements, components, and/or groups thereof. In the figures, dimensions of the various elements, layers, etc. may be exaggerated for clarity of illustration.

It will be understood that, although the terms first, second, etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

In addition, the term "battery cell" used herein includes a rechargeable battery module, such as a lithium ion battery, a lithium polymer battery, or a lithium ion polymer battery.

Further, the term "battery cell" used herein includes small-sized battery cells employed to smart phones, cellular phones, tablet PCs, notebook computers, digital cameras, and the like and large-sized batteries employed to power electric vehicles, hybrid vehicles, electric motorcycles, and the like, but the present invention is not limited thereto.

In addition, the term "holder" used herein includes one or more thermosetting plastics, such as polyethylene (PE), polypropylene (PP), polystyrene (PS), polyvinyl chloride (PVC), acrylonitrile butadiene styrene (ABS), acrylonitrile styrene resin (AN), poly(methyl methacrylate) (PMMA), polyamide (PA), polyoxymethylene (POM), also known as polyacetal, polycarbonate (PC), polyethylene terephthalate (PET), polybutylene terephthalate (PBT), modified polyphenylene ether, or fluoride resin, or one or more thermocurable resins, such as, for example, phenol formaldehyde (PF) resin, urea formaldehyde (UF) resin, melamine formaldehyde (MF) resin, unsaturated polyester (UP) resin, epoxy (EP) resin, or polyurethane (PUR) resin, but the present invention is not limited thereto.

The protection circuit module and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the protection circuit module may be formed on one integrated circuit (IC) chip or on separate IC chips. Further, the various components of the protection circuit module may be implemented on a flexible printed circuit film, a tape carrier package (TCP), a printed circuit board (PCB), or formed on a same substrate as the protection circuit module. Further, the various components of the protection circuit module may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Figure 1A:
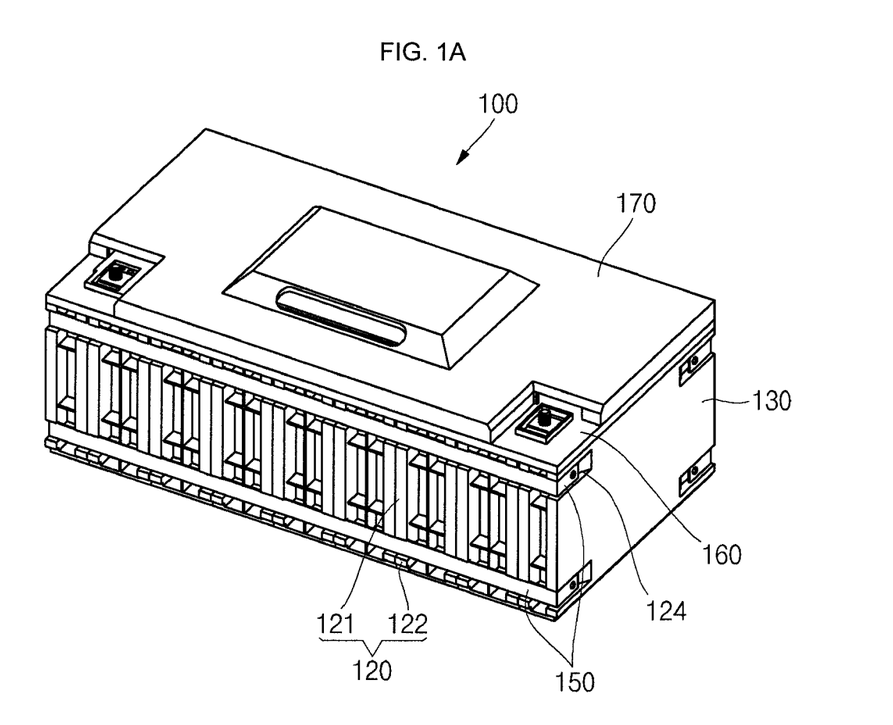
FIG. 1A is a perspective view of a battery module according to an embodiment of the present invention.
Figure 1B:
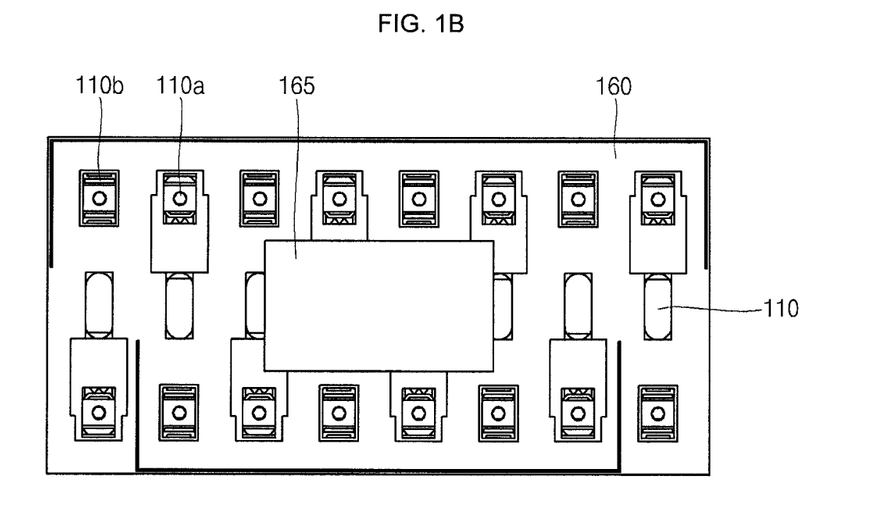
FIG. 1B is a plan view of the battery module illustrated in FIG. 1A in which a top cover and a bus bar are removed therefrom.
Figure 2A:
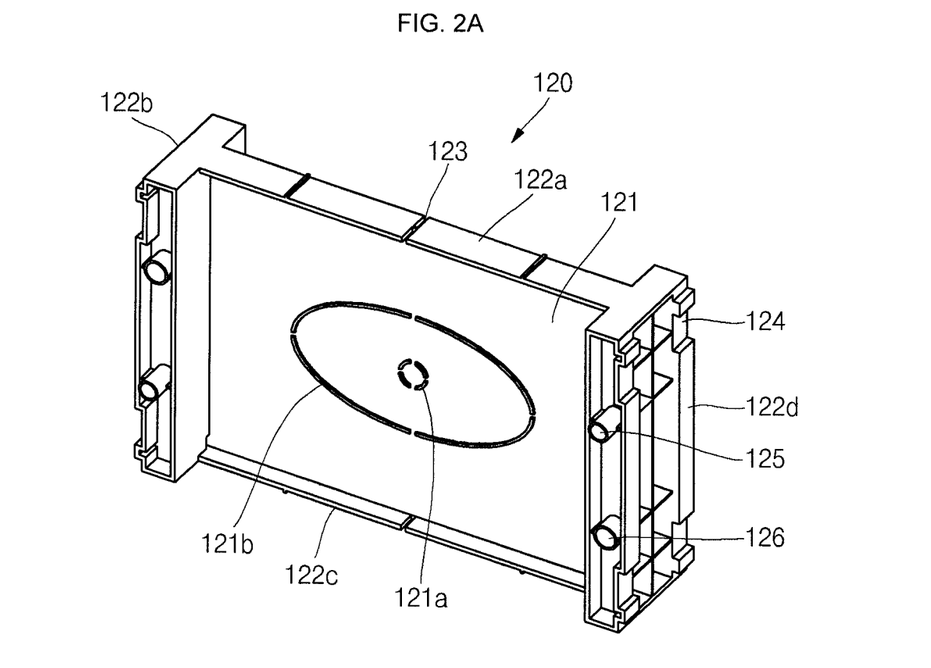
FIG. 2A is a perspective view of a holder illustrated in FIG. 1A.
Figure 2B:
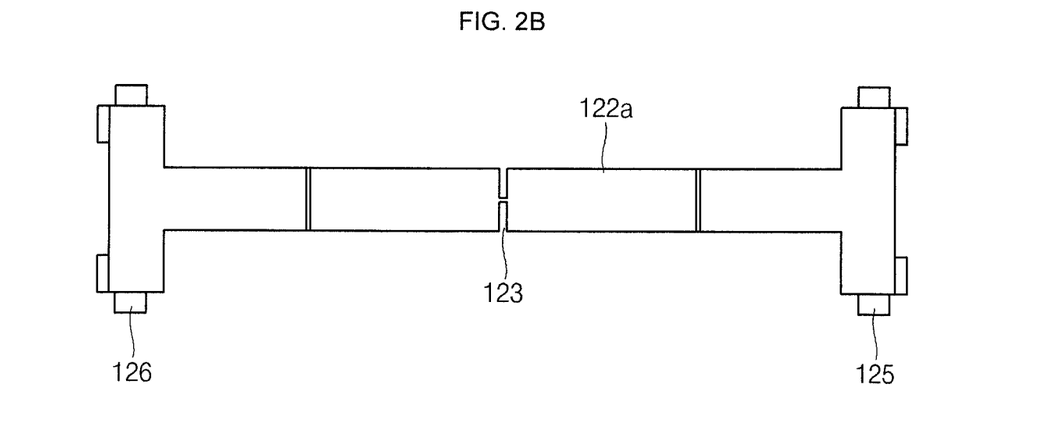
FIG. 2B is a plan view of the holder illustrated in FIG. 1A.
Figure 2C:
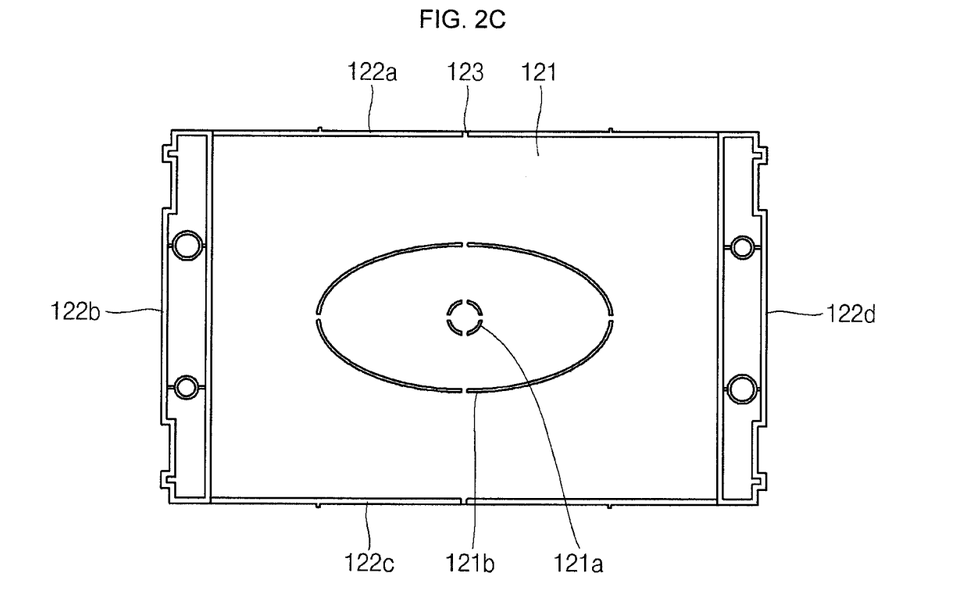
FIG. 2C is a front view of the holder illustrated in FIG. 1A.
Figure 2D:
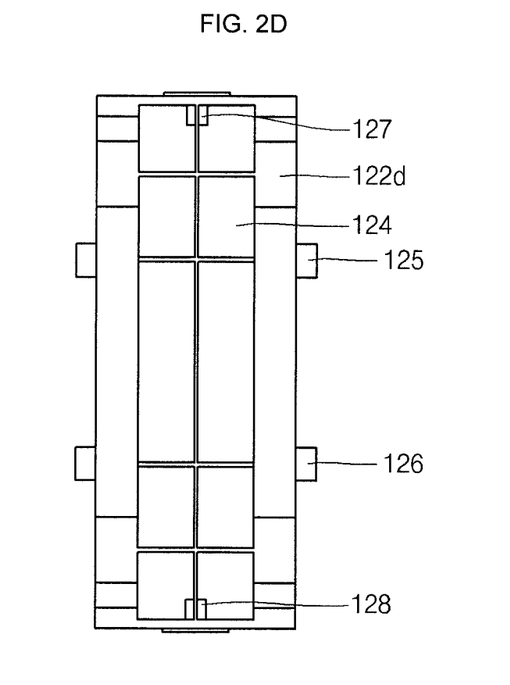
FIG. 2D is a front view of the holder illustrated in FIG. 1A in an assembled state.
Figure 3:
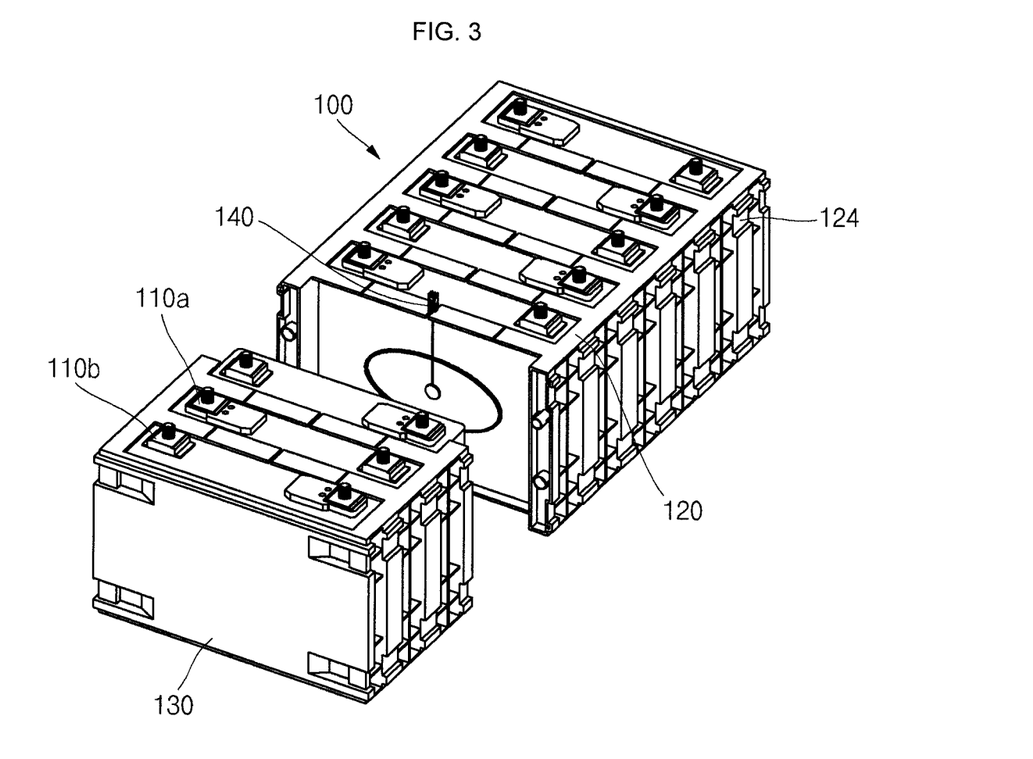
FIG. 3 is a perspective view of the battery module illustrated in FIG. 1A in which a temperature measuring unit is arranged in a holder and a top cover and a bus bar are removed therefrom.
Figure 4:
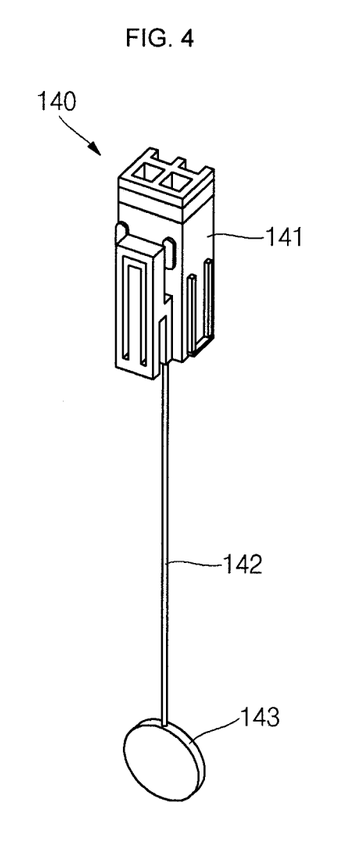
FIG. 4 is a perspective view of the temperature measuring unit illustrated in FIG. 3.
Figure 5A:
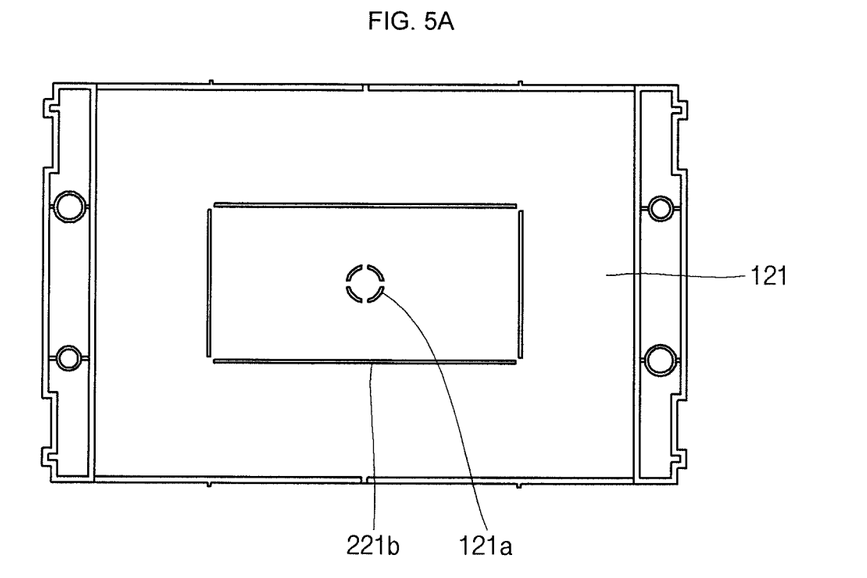
FIG. 5A is a front view of a holder according to another embodiment of the present invention.
Figure 5B:
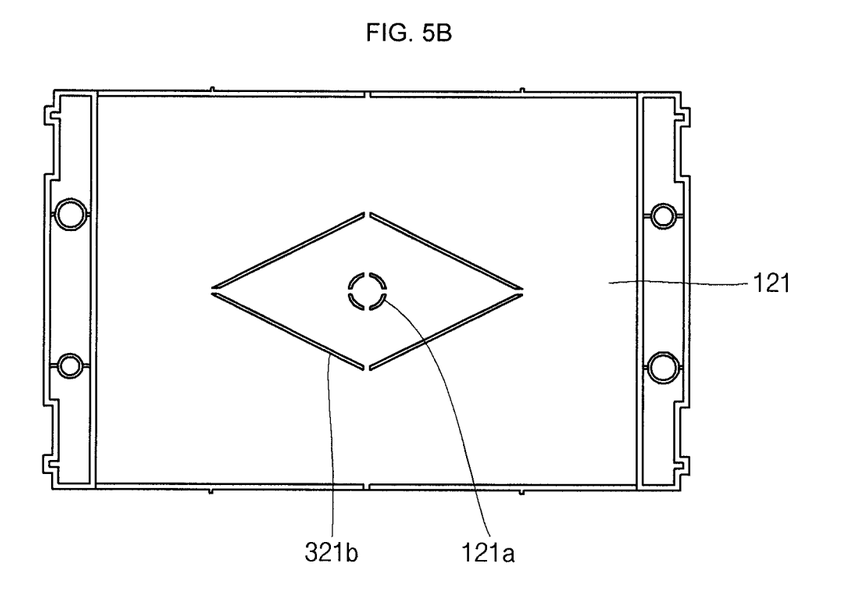
FIG. 5B is a front view of a holder according to still another embodiment of the present invention.

FIG. 1A is a perspective view of a battery module according to an embodiment of the present invention and FIG. 1B is a plan view of the battery module illustrated in FIG. 1A in which a top cover and a bus bar are removed therefrom; FIG. 2A is a perspective view of the holder illustrated in FIG. 1A, FIG. 2B is a plan view of the holder illustrated in FIG. 1A, FIG. 2C is a front view of the holder illustrated in FIG. 1A, and FIG. 2D is a front view of the holder illustrated in FIG. 1A in an assembled state; FIG. 3 is a perspective view of the battery module illustrated in FIG. 1A in which a temperature measuring unit is arranged in a holder and a top cover and a bus bar are removed therefrom; FIG. 4 is a perspective view of the temperature measuring unit illustrated in FIG. 3; and FIG. 5A is a front view of a holder according to another embodiment of the present invention, and FIG. 5B is a front view of a holder according to still another embodiment of the present invention.

Referring to FIGS. 1A to 4, a battery module 100 according to an embodiment of the present invention includes battery cells 110, a holder 120 between adjacent ones of the battery cells 110, a bus bar electrically connected to (e.g., electrically connecting adjacent ones of) the battery cells 110, end plates 130 arranged at opposite ends of the outermost battery cells 110, a temperature measuring unit 140 provided in the holder 120, a binding band 150 binding the holder 120 and the end plates 130 to each other, a middle cover 160 coupled to the holder 120 and the end plates 130, and a top cover 170 coupled to the middle cover 160. In one embodiment, each of the end plates 130 has the same or substantially the same configuration as a half portion of one of the holders 120 (e.g., each of the end plates 130 may have the features of half of one of the holders 120 formed thereon).

The battery cells 110 may include a plurality of battery cells, which may be aligned longitudinally along a line. Each of the battery cells 110 may have an approximately hexahedral shape having two long sides and four short sides, and a positive electrode terminal 110a and a negative electrode terminal 110b may be provided at an upper short side of each of the battery cells 110.

Ones of the holders 120 may be arranged between adjacent ones of the battery cells 110 and may also be arranged longitudinally along a line. The holder 120 has a long side 121 and a short side 122 so as to approximately surround one long side and four short sides of the battery cells 110 (e.g., so as to surround at least a portion of one long side and four short sides of one of the battery cells 110 adjacent thereto). In one embodiment, the long side 121 includes a single long side (e.g., a single face) and the short side 122 includes four short sides 122a, 122b, 122c, and 122d (e.g., short side protrusions). Because the holder 120 is interposed between two facing battery cells 110, the single long side 121 and the four short sides 122a, 122b, 122c, and 122d are configured such that the four short sides 122a, 122b, 122c, and 122d are symmetrically positioned about or around the long side 121.

The holder 120 includes a receiving groove 121a formed in the long side 121 to receive a temperature device 143 (e.g., a temperature probe) and a protrusion 121b spaced from the receiving groove 121a and protruding to surround or substantially surround the receiving groove 121a.

The receiving groove 121a is formed in the long side 121 and is shaped to correspond to the temperature device 143. The receiving groove 121a may be formed at a region of the long side 121 which corresponds to a center of the long side 121 of the battery cells 110. For example, the receiving groove 121a may be formed in a central region of the long side 121 so that the temperature device 143 received therein measures a temperature at a center of the long side of the corresponding battery cell 110. In the illustrated embodiment, the receiving groove 121a has a circular shape, but the present invention is not limited thereto. The receiving groove 121a may have various shapes other than the circular shape according to the shape of the temperature device 143.

The protrusion 121b is formed to protrude from the long side 121 toward the adjacent battery cell 110 thereto so as to make contact with the long side of the respective battery cell 110.

The long side of the adjacent battery cell 110 is offset from (e.g., does not directly contact) the long side 121 of the holder 120 due to the protrusion 121b. For example, a gap or crevice (e.g., a predetermined gap or crevice) may be between the long side 121 of the holder 120 and the long side of the adjacent battery cell 110 due to the protrusion 121b. The long side of the adjacent battery cell 110 is in contact (e.g., is in direct contact) with the protrusion 121b. Accordingly, the battery cells 110 may be cooled by external air passing through the gap or crevice and circulating. The protrusion 121b may be formed to have an oval shape or a polygonal shape. For example, as illustrated in FIG. 2A, the protrusion 121b may be formed to have an oval shape. In another embodiment, a protrusion 221b may be formed to have a rectangular shape, as illustrated in FIG. 5A. In yet another embodiment, a protrusion 321b may be formed to have a rhombic shape, as illustrated in FIG. 5B.

The holder 120 may further include a coupling protrusion 125 and a coupling groove 126 at the short sides 122b and 122d. In one embodiment, the inner diameter of the coupling groove 126 is equal to or similar to the outer diameter of the coupling protrusion 125. Neighboring holders 120 may be coupled to (e.g., combined with) each other by the coupling protrusion 125 and the coupling groove 126. For example, according to embodiments of the present invention, a plurality of holders 120 may be coupled to each other (e.g., combined with one another) while surrounding the battery cells 110. Therefore, assembly of the battery module 100 may be further facilitated.

In addition, the long side 121 of the holder 120 further includes a wire groove in which a wire 142, which electrically connects the temperature device 143 and a connector 141 (e.g., a connector unit), is mounted.

The short side 122a of the holder 120 further includes a fixing part 123 (e.g., a fixing groove) at which the connector 141 is fixed and exposed to outside of the holder 120.

When the battery cells 110 are repeatedly charged and discharged, heat may be generated. If the generated heat is not dissipated and battery cells 110 overheat, the battery cells 110 may not properly operate. Therefore, according to embodiments of the present invention, in order to prevent the battery cells 110 from overheating, the holder 120 may include cooling openings 127 (e.g., cooling holes) which are at an outermost portion of the holder 120 to be adjacent cooling openings 127 in another one of the holders 120 when arranged in the battery module 100.

For example, in order to increase cooling efficiency of the battery cells 110, the holder 120 includes a plurality of cooling openings 127 formed at upper edges of the short sides 122b and 122d. In one embodiment, the cooling openings 127 are formed at the upper edges of the short sides 122b and 122d provided at opposite sides of the holder 120 facing toward the battery cells 110 to induce external air to flow into or to flow out from the space between the long side 121 of the holders 120 and the battery cells 110, thereby cooling the battery cells 110.

In order to exhaust any condensed water accumulated on the battery cells 110, the holder 120 includes exhaust openings 128 (e.g., exhaust holes) formed at lower regions of the short sides 122b and 122d. For example, the exhaust openings 128 open toward the battery cells 110 at lower sides of the short sides 122b and 122d and are provided at opposite sides of the holder 120, thereby allowing condensed water accumulated on the battery cells 110 due to a temperature difference between the battery cells 110 and the external air to be exhausted to outside the holder 120. When the temperature difference between the temperature of the outside (e.g., the temperature of the external air) and the battery cells 110 is greater than or equal to a certain value, condensed water may accumulate on surfaces of the battery cells 110. The condensed water is exhausted (e.g., drained) to the outside through the exhaust openings 128. In one embodiment, the exhaust openings 128 may perform the same or substantially the same function as the cooling openings 127.

The holder 120 further includes a binding groove 124 having a depth (e.g., a predetermined depth) and is formed to allow the binding band 150 to be coupled to the short sides 122b and 122d of the holder 120. The binding band 150 is arranged in (e.g., coupled to) the binding groove 124 so that the plurality of battery cells 110 and the holder 120 may together constitute one battery module 100.

The bus bar electrically connects adjacent ones of the battery cells 110 in series or in parallel. For example, a positive electrode terminal 110a of one battery cell 110 and a negative electrode terminal 110b of another battery cell 110 which is adjacent to the positive electrode terminal 110a may be electrically connected to each other by the bus bar.

The end plates 130 are positioned at opposite ends of outermost ones of the battery cells 110 from among the longitudinally arranged battery cells 110. The end plates 130 may be separate from (e.g., produced separately from) the holder 120. Alternatively, each of the end plates 130 may have substantially the same configuration as a half portion of the holder 120. As an example, in one embodiment, each of the end plates 130 may have one long side and four short sides which are the same or substantially the same as the long side and short sides of the holder 120. In addition, each of the end plates 130 may further include a cooling opening and an exhaust opening.

In the illustrated embodiment, eight battery cells 110, seven holders 120, and two end plates 130 are provided, but aspects of the present invention are not limited thereto.

Because top and bottom surfaces of the battery cells 110 are exposed to the outside, heat from the battery cells 110 is likely to be carried away from the battery cells 110 by the external air and/or the bus bar. Therefore, the temperature measured by the conventional temperature device in contact with the top or bottom surface of the battery cells 110 may not sufficiently account for (e.g., may not accurately measure) the temperature of the battery cells 110. However, according to embodiments of the present invention, the temperature measuring unit 140 is provided so as to make contact with the long sides of the battery cells 110, thereby measuring the temperature of the long sides of the battery cells 110. Because the temperature of the long sides of the battery cells 110 is not substantially affected by external factors, the temperature of the battery cells 110 can be more accurately measured by arranging the temperature measuring unit 140 according to embodiments of the present invention.

The temperature measuring unit 140 is provided in the holder 120 to make contact with the long sides of the battery cells 110 and measures the temperature of the long sides of the battery cells 110. In the illustrated embodiment, the temperature measuring unit 140 provided within the single holder 120 is illustrated by way of example, and aspects of the present invention are not limited thereto. For example, the temperature measuring unit 140 may be provided within every holder 120 disposed between the battery cells 110 or within every other holder 120.

The temperature measuring unit 140 includes the temperature device 143 for measuring the temperature of the long sides of the battery cells 110 and the wire 142 and the connector 141 for transmitting data regarding the temperature measured by the temperature device 143 to an external device. The temperature device 143 may be a thermistor. For example, the thermistor may be a resistive thermistor in which an electric resistance thereof varies according to the temperature thereof. The thermistor generates an electric signal corresponding to the temperature of the long side of the respective battery cell 110, thereby providing a temperature measurement. The generated electric signal may be transmitted to a protection circuit module (165 of FIG. 1B) through the wire 142 and the connector 141 at an end of the temperature measuring unit 140. In one embodiment, the electric signal transmitted to the protection circuit module 165 may be used in monitoring a temperature change of the battery cells 110 and controlling charge and discharge operations of the battery cells 110. The protection circuit module 165 may prevent or substantially prevent the battery cells 110 from overheating or exploding due to over-charge, over-discharge, or over-current based on the temperature data (e.g., the temperature measurements) transmitted from the temperature device 143. The protection circuit module 165 may include a protection device. The protection device may be a passive safety device, such as resistors and/or condensers, and/or active devices, such as field effect transistors and integrated circuits.

The binding band 150 binds the holder 120 and the end plates 130 to each other, thereby allowing the battery cells 110, the holder 120, and the end plates 130 to together constitute the battery module 100. The binding band 150 is bent to have an approximately "U" shaped configuration and is arranged in or coupled to the binding groove 124 of the holders 120. In addition, the binding band 150 is formed in two parallel lines (e.g., two binding bands 150 extending parallel to each other are provided) such that the cooling openings 127 provided at opposite sides of the holders 120 are not covered or clogged. For example, the binding band 150 is configured to extend from one side end plate 130 to the opposite side end plate 130 at the opposite sides of the holders 120.

The middle cover 160 is provided between the battery cells 110 and the bus bar to prevent the bus bar, which electrically connects the positive electrode terminal 110a of one of the battery cells 110 and the negative electrode terminal 110b of an adjacent one of the battery cells 110, from being unintentionally electrically shorted. For example, the middle cover 160 is coupled to top portions of the battery cells 110 and the bus bar, and the protection circuit module 165 is then coupled to the middle cover 160.

The top cover 170 is coupled to (e.g., combined with) the middle cover 160 to protect the bus bar and the protection circuit module 165 from external circumstances or contact. For example, the top cover 170 is coupled to a fastening unit (e.g., a fastener) provided in or on the middle cover 160, thereby protecting the bus bar and the protection circuit module 165 provided therein from external circumstances or contact.

Therefore, the afore-constructed battery module 100 according to an embodiment of the present invention can more accurately measure the temperature of the long sides of the battery cells 110 by arranging the temperature measuring unit 140 in the holder 120, which is disposed between and accommodates each of the battery cells 110.

While the battery module according to embodiments of the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A battery module comprising:
   a first battery cell;
   a second battery cell, each of the first and second battery cells having first sides and second sides, the first sides being larger than the second sides;
      a holder between the first battery cell and the second battery cell, the holder having:
      a long side contacting the first sides of the first battery cell and the second battery cell;
      a short side extending from a periphery of the long side toward the first, battery cell and the second battery cell and contacting a second side of each of the first battery cell and the second battery cell;
      a protrusion protruding from the long side of the holder toward one of the first battery cell and the second battery cell and a second protrusion substantially extending around the protrusion, the second protrusion having an oval shape or a polygonal shape; and
      a receiving groove located on the long side of the holder; and
   a temperature measuring unit accommodated in the receiving groove in the holder, contacting the first side of the one of the first and second battery cells, and being configured to measure a temperature of at least the at least the one of first and second battery cells.

2. The battery module of claim 1, wherein the temperature measuring unit comprises:
   a temperature device configured to measure the temperature of at least the one of the first and second battery cells; and
   a connector configured to transmit data regarding the temperature measured by the temperature device.

3. The battery module of claim 2, wherein the long side of the holder has a wire groove in which a wire electrically connecting the temperature device and the connector is arranged.

4. The battery module of claim 2, wherein the short side of the holder has a fixing groove, and the connector is arranged in the fixing groove and exposed to outside of the holder.

5. The battery module of claim 1, wherein the second protrusion protrudes from the long side of the holder toward the first battery cell and contacts the first battery cell.

6. The battery module of claim 1, wherein the receiving groove is at a portion of the long side of the holder which corresponds to a center of the first sides of the first battery cell and the second battery cell.

7. The battery module of claim 1, wherein the holder further has a cooling opening at the short side thereof and configured to allow air to enter between the first battery cell and the long side of the holder to cool the first battery cell, and an exhaust opening at the short side thereof and configured to allow condensed water accumulated on the first battery cell to drain from the holder.

8. The battery module of claim 1, wherein the holder further has a coupling protrusion and a coupling groove in the short side thereof, the coupling protrusion and the coupling groove being configured to be combined with the coupling groove and the coupling protrusion, respectively, of another holder.

9. The battery module of claim 1, wherein the temperature measuring unit comprises:
   a temperature device configured to measure the temperature of at least the one of the first and second battery cells; and
   a connector configured to transmit data regarding the temperature measured by the temperature device, and
   wherein the protrusion and the second protrusion each have a wire groove therein in which a wire electrically connecting the temperature device and the connector is arranged.

* * * * *

UNITED STATES PATENT AND TRADEMARK OFFICE
CERTIFICATE OF CORRECTION

PATENT NO. : 10,396,406 B2
APPLICATION NO. : 15/094627
DATED : August 27, 2019
INVENTOR(S) : Dohyung Lee

Page 1 of 1

It is certified that error appears in the above-identified patent and that said Letters Patent is hereby corrected as shown below:

In the Claims

| | |
|---|---|
| Column 9, Line 12 approx., Claim 1 | delete "first," and insert -- first -- |
| Column 9, Lines 25-26 approx., Claim 1 | delete "at least the at least the" and insert -- at least the -- |
| Column 9, Line 26 approx., Claim 1 | after "of", insert -- the -- |

Signed and Sealed this
Fourth Day of August, 2020

Andrei Iancu
*Director of the United States Patent and Trademark Office*